United States Patent
Dai et al.

(10) Patent No.: US 10,919,112 B2
(45) Date of Patent: *Feb. 16, 2021

(54) METHOD AND SYSTEM FOR MANUFACTURING A LITHIUM METAL NEGATIVE ELECTRODE

(71) Applicant: GM GLOBAL TECHNOLOGY OPERATIONS LLC, Detroit, MI (US)

(72) Inventors: Fang Dai, Troy, MI (US); Hongliang Wang, Sterling Heights, MI (US); Wayne Cai, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/967,079

(22) Filed: Apr. 30, 2018

(65) Prior Publication Data

US 2019/0329353 A1 Oct. 31, 2019

(51) Int. Cl.
*B23K 26/21* (2014.01)
*H01M 10/052* (2010.01)
(Continued)

(52) U.S. Cl.
CPC .......... *B23K 26/21* (2015.10); *H01M 4/0483* (2013.01); *H01M 4/1395* (2013.01);
(Continued)

(58) Field of Classification Search
CPC ...... B23K 26/21; B23K 26/38; B23K 26/082; B23K 26/032; B23K 26/0884;
(Continued)

(56) References Cited

U.S. PATENT DOCUMENTS

| 9,694,445 | B2 * | 7/2017 | Chen ................... B23K 26/0846 |
| 2010/0285353 | A1 * | 11/2010 | Katayama ............... H01M 2/26 |
| | | | 429/185 |

(Continued)

FOREIGN PATENT DOCUMENTS

| CN | 101752607 B | * | 5/2012 | .............. H01M 4/04 |
| CN | 104023900 A | * | 9/2014 | ............. B23K 26/22 |
| CN | 104821403 A | * | 8/2015 | ........ H01M 10/0585 |

OTHER PUBLICATIONS

Jiang Laser Welding under Vacuum: A Review 2017 Appl. Sci., pp. 1-17 (Year: 2017).*

(Continued)

*Primary Examiner* — Ibrahime A Abraham
*Assistant Examiner* — William C. Gibson
(74) *Attorney, Agent, or Firm* — Quinn IP Law (57) ABSTRACT

A negative electrode for an electrochemical cell of a lithium metal battery may be manufactured by joining together a metallic current collector piece and a lithium metal piece. The metallic current collector piece may be positioned adjacent the lithium metal piece in an at least partially lapped configuration at a weld site. A laser beam may be directed at an upper surface of the metallic current collector piece at the weld site to melt a portion of the lithium metal piece adjacent the metallic current collector piece and produce a lithium metal molten weld pool. The second laser beam may be terminated to solidify the lithium metal molten weld pool into a solid weld joint that physically bonds the lithium metal piece and the metallic current collector piece together at the weld site.

13 Claims, 5 Drawing Sheets (51) Int. Cl.
*H01M 4/04* (2006.01)
*H01M 4/1395* (2010.01)
*H01M 4/38* (2006.01)
*H01M 4/02* (2006.01)
*B23K 101/36* (2006.01)

(52) U.S. Cl.
CPC ......... *H01M 4/382* (2013.01); *H01M 10/052* (2013.01); *B23K 2101/36* (2018.08); *H01M 2004/027* (2013.01)

(58) Field of Classification Search
CPC .... B23K 26/34; B23K 26/064; B23K 26/244; B23K 26/0626; B23K 26/206; B23K 26/24; B23K 26/26; B23K 26/705; B23K 26/03; B23K 26/0665; B23K 26/067; B23K 26/073; B23K 26/0853; B23K 26/0648; B23K 26/707; B23K 26/02; B23K 26/035; B23K 26/048; B23K 26/06; B23K 26/0604; B23K 26/0643; B23K 26/0838; B23K 26/103; B23K 26/362; B23K 26/009; B23K 26/034; B23K 26/04; B23K 26/042; B23K 26/043; B23K 26/044; B23K 26/062; B23K 26/0652; B23K 26/0869; B23K 26/1438; B23K 26/20; B23K 26/354; B23K 2101/36; B23K 2101/18; B23K 2101/28; B23K 15/0046; B23K 33/00; B23K 1/0056; B23K 9/095; B23K 10/006; B23K 15/0013; B23K 1/005; B23K 2103/00; B23K 28/02; B23K 31/00; B23K 37/047; B23K 9/0953; B23H 9/10; G02B 6/4296; G02B 6/4206; G02B 6/0006; G02B 6/0018; G02B 6/0028; G02B 6/0031; G02B 6/0095; G02B 6/4226; G02B 6/4227; G02B 2006/12121; G02B 26/127; G02B 27/0927; G02B 27/0955; G02B 27/0994; G02B 27/30; H01M 10/052; H01M 10/0413; H01M 10/058; H01M 10/425; H01M 2/26; H01M 2004/027; H01M 4/382; H01M 4/0483; H01M 2/0426; H01S 3/0071; H01S 5/20; H01S 5/02288; H01S 5/026; H01S 5/4012; H01S 5/4031; H01S 3/00; H01S 3/10069; H01S 3/101; H01S 3/13; H01S 3/1305
USPC ............ 219/121.63, 121.64, 121.67, 121.13, 219/121.45, 121.14, 121.82, 130.21, 219/121.62, 121.72, 121.73, 121.8, 219/121.83, 121.85, 137 R, 121.6, 121.61, 219/121.69, 121.74, 121.75, 121.79, 219/121.81, 130.51, 136; 228/9, 102, 228/103, 155, 173.1, 18; 29/557, 878; 403/270

See application file for complete search history.

(56) References Cited

U.S. PATENT DOCUMENTS

| | | | |
|---|---|---|---|
| 2017/0028515 A1* | 2/2017 | De Souza | B23K 26/244 |
| 2017/0299900 A1* | 10/2017 | Montoya | H01S 3/005 |
| 2018/0190963 A1* | 7/2018 | Guo | H01M 10/0431 |
| 2019/0013543 A1* | 1/2019 | Tao | H01M 4/366 |
| 2019/0351622 A1* | 11/2019 | Nishimagi | B29C 65/1635 |
| 2019/0363357 A1* | 11/2019 | Yura | C04B 38/0054 |

OTHER PUBLICATIONS

Adrian Lutey Laser Cutting of Lithium Iron Phosphate Battery Electrodes: Characterization of Process Efficiency and Quality Aug. 20, 2014 Optics and Laser Technology, 65 (2015) 164-174 (Year: 2014).*

Quintino Conduction Laser Welding 2013 Woodhead Publishing Limited, pp. 139-162 (Year: 2013).*

* cited by examiner

METHOD AND SYSTEM FOR MANUFACTURING A LITHIUM METAL NEGATIVE ELECTRODE

INTRODUCTION

A battery is a device that stores chemical energy and can convert its stored chemical energy into electrical energy on demand by means of electrochemical reduction-oxidation (redox) reactions. In secondary or rechargeable batteries, these electrochemical reactions are reversible, which allows the batteries to undergo multiple charging and discharging cycles.

An electrochemical cell of a secondary lithium battery generally includes a negative electrode and a positive electrode separated from each other by an ionically conductive (and electrically insulative) electrolyte. The electrolyte provides a medium through which lithium ions can be transferred between the electrodes during charging and discharging of the cell. Energy is stored in the negative and positive electrodes of the cell in the form of lithium, with the energy density of the cell determined by the lithium storage capacity of the electrodes per unit mass and the electrochemical potential difference of lithium between the negative electrode and the positive electrode. Lithium metal has a relatively low density and exhibits the most negative electrochemical potential of any element (relative to the standard hydrogen electrode), allowing for the highest possible electrochemical potential difference within an electrochemical cell and thus making it an ideal material for the negative electrode of a lithium battery.

In practice, the negative and positive electrodes in an electrochemical cell are each electrically coupled to an electrically conductive metallic current collector, which provide a medium through which electrons can travel from one electrode to the other via an external circuit. Therefore, the practical use of lithium metal as the negative electrode material of a lithium battery necessitates the development of a method that can be used to form a robust physical and electrical bond between a lithium metal layer and a metallic current collector, without adversely impacting the mechanical integrity of the lithium metal layer and without triggering any undesirable chemical reactions between the lithium metal layer and the surrounding environment.

SUMMARY

A system for manufacturing a negative electrode for an electrochemical cell of a lithium metal battery may include a first platform, a second platform, a laser scanning head coupled to a laser beam generator, a gantry, and a control unit. The first platform may travel in a first direction and may be configured to deliver a continuous lithium metal sheet to a cutting station and to transfer a lithium metal piece from the cutting station to a joining station. The second platform may travel in a second direction opposite the first direction and may be configured to deliver a metallic current collector piece to the joining station. The laser scanning head may include a plurality of moveable mirrors configured to direct a focused laser beam at a target surface and to advance the laser beam along a predefined travel path relative to the target surface to perform a laser cutting operation at the cutting station or a laser joining operation at the joining station. The gantry may move the laser scanning head in a two-dimensional plane and may transfer the laser scanning head between the cutting station and the joining station. The control unit may control and coordinate operation of the first and second platforms, the laser beam generator, the laser scanning head, and the gantry so that the laser scanning head can perform a laser cutting operation at the cutting station and subsequently can perform a laser joining operation at the joining station.

At the joining station, a downstream end of the second platform may be positioned above a downstream end of the first platform so that the metallic current collector sheet can drop from the downstream end of the second platform onto the downstream end of the first platform at the joining station.

The system may include a shaping station located between the cutting station and the joining station. In such case, the first moving platform may be configured to transfer the lithium metal piece from the cutting station to the shaping station and then to the joining station.

The joining station may include a transparent cover that can be positioned over an upper surface of the metallic current collector piece to hold the lithium metal piece and the metallic current collector piece adjacent one another and in an at least partially lapped configuration during a laser joining operation wherein the lithium metal piece and the metallic current collector piece are physically bonded to one another.

The first and second platforms may be respectively supported by a first set and a second set of rollers.

The system may include a chamber that encloses the cutting station and the joining station, a vacuum pump and evacuation system in fluid communication with an interior of the chamber, and an inert gas supply in fluid communication with the interior of the chamber.

A method of manufacturing a negative electrode for an electrochemical cell of a lithium metal battery may include one or more of the following steps. In step (a), a continuous lithium metal sheet may be delivered to a cutting station. In step (b), a first laser beam may be directed at an upper surface of the lithium metal sheet and advanced relative to the upper surface of the lithium metal sheet to cut off an end portion of the lithium metal sheet and form a lithium metal piece. In step (c), the lithium metal piece may be delivered to a joining station. In step (d), a metallic current collector piece may be positioned adjacent the lithium metal piece in an at least partially lapped configuration such that a faying surface of the metallic current collector piece confronts a faying surface of the lithium metal piece to establish a faying interface between the pieces at a weld site. In step (e), a transparent cover may be positioned over the metallic current collector piece at the weld site such that the transparent cover presses against an upper surface of the metallic current collector piece and the faying surfaces of the metallic current collector piece and the lithium metal piece press against each other at the weld site. In step (f), a second laser beam may be directed at the upper surface of the metallic current collector piece at the weld site to melt a portion of the lithium metal piece adjacent the faying surface of the metallic current collector piece and produce a lithium metal molten weld pool that wets the faying surface of the metallic current collector piece. In step (g), the second laser beam may be terminated to solidify the lithium metal molten weld pool into a solid weld joint that physically bonds the lithium metal piece and the metallic current collector piece together at the weld site. Steps (a) through (g) may be continuously repeated and coordinated so that steps (b) and (f) can be performed at different times using the same laser scanning head.

The first laser beam may be a pulsed laser beam having a power density in the range of $5.0\times10^5$ W/cm$^2$ to $1.0\times10^9$ W/cm$^2$ and a pulse repetition rate in the range of 1 kHz to 100 kHz.

The second laser beam may be a pulsed laser beam having a power density in the range of $3\times10^5$ W/cm$^2$ to $1\times10^7$ W/cm$^2$ and a pulse repetition rate in the range of 100 kHz to 10 MHz.

The continuous lithium metal sheet and the lithium metal piece may be respectively delivered to the cutting station and to the joining station by a first platform traveling in a first direction. In such case, the metallic current collector piece may be delivered to the joining station by a second platform traveling in a second direction opposite the first direction.

The first and second laser beams may be generated by the same laser beam generator and movement of the first and second laser beams may be accomplished by a plurality of moveable mirrors housed within the same laser scanning head.

Prior to step (c), the lithium metal piece may be transferred to a shaping station. In such case, a third laser beam may be directed at an upper surface of the lithium metal piece and advanced relative to the upper surface of the lithium metal piece to trim the lithium metal piece into a desired shape. The first, second, and third laser beams may be generated by the same laser beam generator and movement of the first, second, and third laser beams may be accomplished by a plurality of moveable mirrors housed within the same laser scanning head.

In step (b), the first laser beam may be advanced relative to the upper surface of the lithium metal sheet in a linear path across an entire width of the lithium metal sheet.

In step (f), the second laser beam may be advanced relative to the upper surface of the metallic current collector piece in a non-linear path at the weld site. In one form, the second laser beam may be advanced relative to the upper surface of the metallic current collector piece from a start point toward an end point in a forward direction and back and forth in a lateral direction transverse to the forward direction. In one specific example, the second laser beam may be advanced relative to the upper surface of the metallic current collector piece from a start point toward an end point in a forward direction while gyrating the second laser beam.

The cutting station and the joining station may be enclosed in a chamber. In such case, a subatmospheric pressure environment or an inert gas environment may be established within the chamber to prevent oxidation and combustion of the lithium metal sheet and the lithium metal piece during steps (b) and (f).

Prior to step (d), a fourth laser beam may be directed at an upper surface of a metallic current collector sheet and advanced relative to the upper surface of the metallic current collector sheet to cut off an end portion of the metallic current collector sheet and form the metallic current collector piece. The first, second, and fourth laser beams may be generated by the same laser beam generator and movement of the first, second, and fourth laser beams may be accomplished by a plurality of moveable mirrors housed within the same laser scanning head.

The metallic current collector piece may comprise a non-porous metallic foil, a perforated metallic sheet, or a porous metallic mesh. The metallic current collector piece may comprise at least one metal or metal alloy selected from the group consisting of copper, nickel, stainless steel, and titanium.

The solid weld joint may be formed between the lithium metal piece and the metallic current collector piece without use of a flux, filler, or solder material.

DETAILED DESCRIPTION

The presently disclosed method and system can be used to continuously and sequentially manufacture a plurality of negative electrodes from a continuous lithium metal sheet and a continuous metallic current collector sheet using a multipurpose laser scanning head. The continuous lithium metal sheet and the continuous metallic current collector sheet may be cut into a plurality of discrete pieces by the multipurpose laser scanning head. Thereafter, the same multipurpose laser scanning head may be used to physically bond a metallic current collector piece to a lithium metal piece to form a unitary negative electrode for an electrochemical cell of a lithium metal battery.

Figure 1:
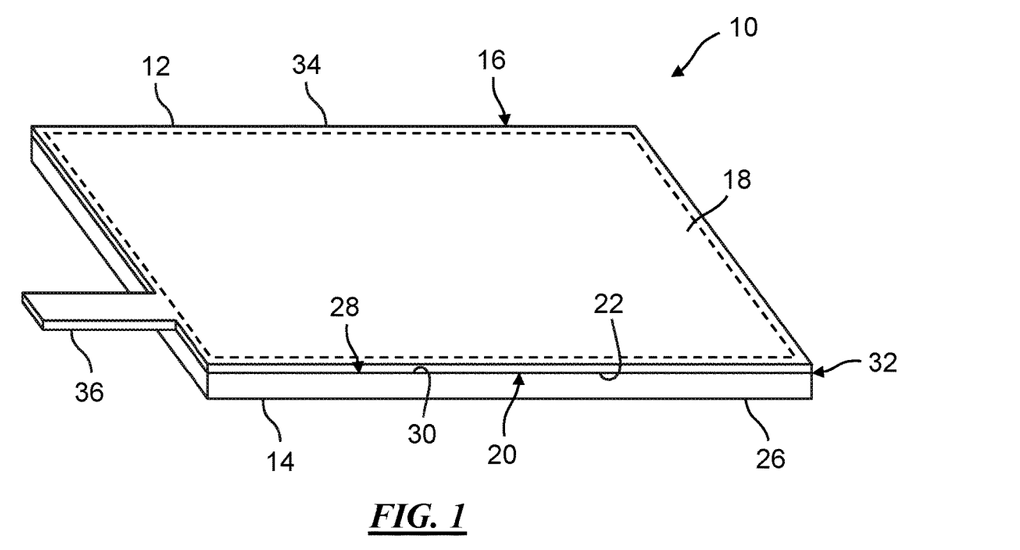
FIG. 1 is a perspective view of a negative electrode for an electrochemical cell of a lithium metal battery including a lithium metal piece physically bonded to a metallic current collector piece by a solid weld joint.

FIG. 1 illustrates in idealized fashion a perspective view of one embodiment of a negative electrode 10 of an electrochemical cell (not shown) for a secondary lithium metal battery (not shown). The negative electrode 10 includes a negative electrode current collector 12 and a lithium metal negative electrode material layer 14 physically and electrically coupled to the negative electrode current collector 12. The negative electrode current collector 12 includes a first side 16 that defines an outer surface 18 and an opposite second side 20 that defines a faying surface 22. Likewise, the lithium metal negative electrode material layer 14 includes a first side 24 that defines an outer surface 26 and an opposite second side 28 that defines a faying surface 30. The negative electrode current collector 12 and the lithium metal negative electrode material layer 14 are physically bonded to each other at a faying interface 32 established between their respective faying surfaces 22, 30 by one or more solid weld joints (not shown). The weld joints formed at the faying interface 32 between the negative electrode current collector 12 and the lithium metal negative electrode material layer 14 help maintain electrical contact therebetween and also may help prevent delamination or separation between the lithium metal negative electrode material layer 14 and the negative electrode current collector 12. In FIG. 1, the negative electrode current collector 12 includes a body portion 34 that is coextensive with the lithium metal negative electrode material layer 14 and a negative polarity connection tab 36 that extends away from the body portion 34, beyond a periphery of the lithium metal negative electrode material layer 14.

Figure 2:
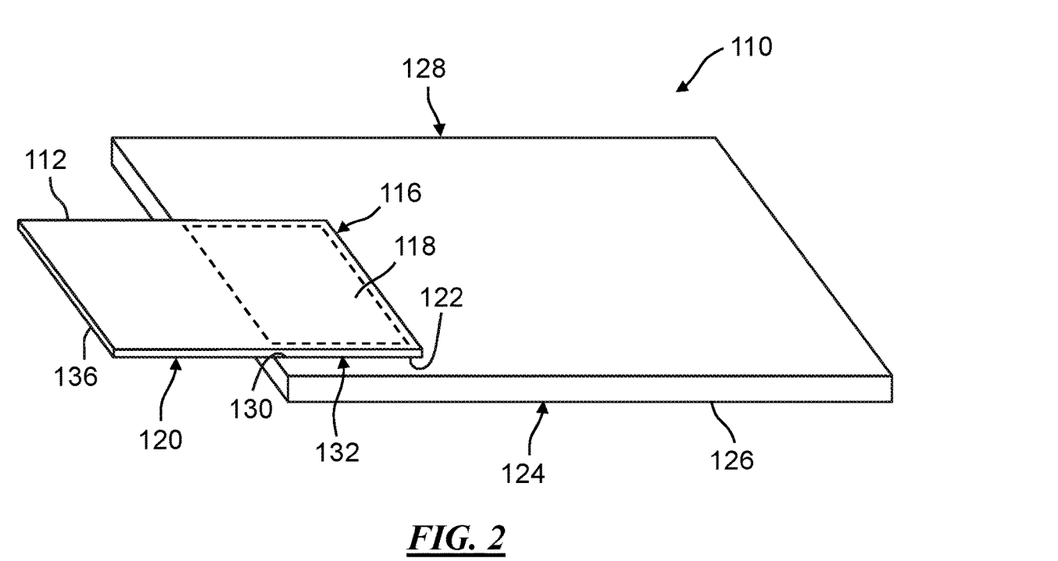
FIG. 2 is a perspective view of another negative electrode for an electrochemical cell of a lithium metal battery including a lithium metal piece physically bonded to a metallic current collector piece by a solid weld joint.

FIG. 2 illustrates another embodiment of a negative electrode 110 of an electrochemical cell (not shown) for a secondary lithium metal battery (not shown). The negative electrode 110 illustrated in FIG. 2 is similar in many respects to the negative electrode 10 depicted in FIG. 1, and like numerals between the embodiments generally designate like or corresponding elements; the descriptions of the embodiments are incorporated by reference into one another and the common subject matter generally may not be repeated here.

Like the negative electrode 10, the negative electrode 110 includes a negative electrode current collector 112 and a lithium metal negative electrode material layer 114 physically and electrically coupled to the negative electrode current collector 112. In addition, the negative electrode current collector 112 includes a first side 116 that defines an outer surface 118 and an opposite second side 120 that defines a faying surface 122. Likewise, the lithium metal negative electrode material layer 114 includes a first side 124 that defines an outer surface 126 and an opposite second side 128 that defines a faying surface 130. The negative electrode current collector 112 and the lithium metal negative electrode material layer 114 are physically bonded to each other at a faying interface 132 established between their respective faying surfaces 122, 130 by one or more solid weld joints (not shown). In FIG. 2, the negative electrode current collector 112 includes a relatively small body portion 134 (as compared to the body portion 34 of FIG. 1) that is incommensurate with the lithium metal negative electrode material layer 114 and a negative polarity connection tab 136 that extends away from the body portion 34, beyond a periphery of the lithium metal negative electrode material layer 14.

The negative electrode current collectors 12, 112 may comprise any metallic material that can collect and reversibly pass free electrons to and from their respective negative electrode material layers 14, 114. The term "metallic," as used herein refers to a material that predominantly comprises one or more metals. As such, a metallic material may comprise a single metal, more than one metal (in alloy form or otherwise), or both one or more metals and one or more other non-metal components in elemental or compound form. For example, the negative electrode current collectors 12, 112 may comprise an electrically conductive metal or metal alloy, e.g., a transition metal or an alloy thereof. In some specific examples, one or both of the negative electrode current collectors 12, 112 may comprise copper, nickel, an iron alloy (e.g., stainless steel), or titanium. Other electrically conductive metals may of course be used, if desired. The negative electrode current collectors 12, 112 may be in the form of thin and flexible non-porous metallic foils, porous metallic meshes, or perforated metallic sheets. The specific configuration of the negative electrode current collectors 12, 112 may depend upon the intended application of the electrochemical cell in which they are used. The negative electrode current collectors 12, 112 may have thicknesses in the range of 8 micrometers to 150 micrometers.

The lithium metal negative electrode material layers 14, 114 may consist essentially of lithium (Li) metal. For example, the lithium metal negative electrode material layers 14, 114 may comprise, by weight, greater than 97% lithium or, more preferably, greater than 99% lithium. In one form, the lithium metal negative electrode material layers 14, 114 may be in the form of thin and flexible non-porous lithium metal foils. The lithium metal negative electrode material layers 14, 114 have a relatively low melting point, as compared to the melting point of the negative electrode current collectors 12, 112. For example, in embodiments where the lithium metal negative electrode material layers 14, 114 comprise lithium, the layers 14, 114 may have melting points of about 180.5° C. In embodiments where the current collector layer 120 comprises copper, the layer 120 may have a melting point of about 1085° C. In embodiments where the current collectors 12, 112 comprise nickel, the current collectors 12, 112 may have melting points of about 1455° C. In embodiments where the current collectors 12, 112 comprise an iron alloy, the current collectors 12, 112 may have melting points in the range of about 1300° C. to 1500° C. In embodiments where the current collectors 12, 112 comprise titanium, the current collectors 12, 112 may have melting points of about 1668° C.

Figure 3:
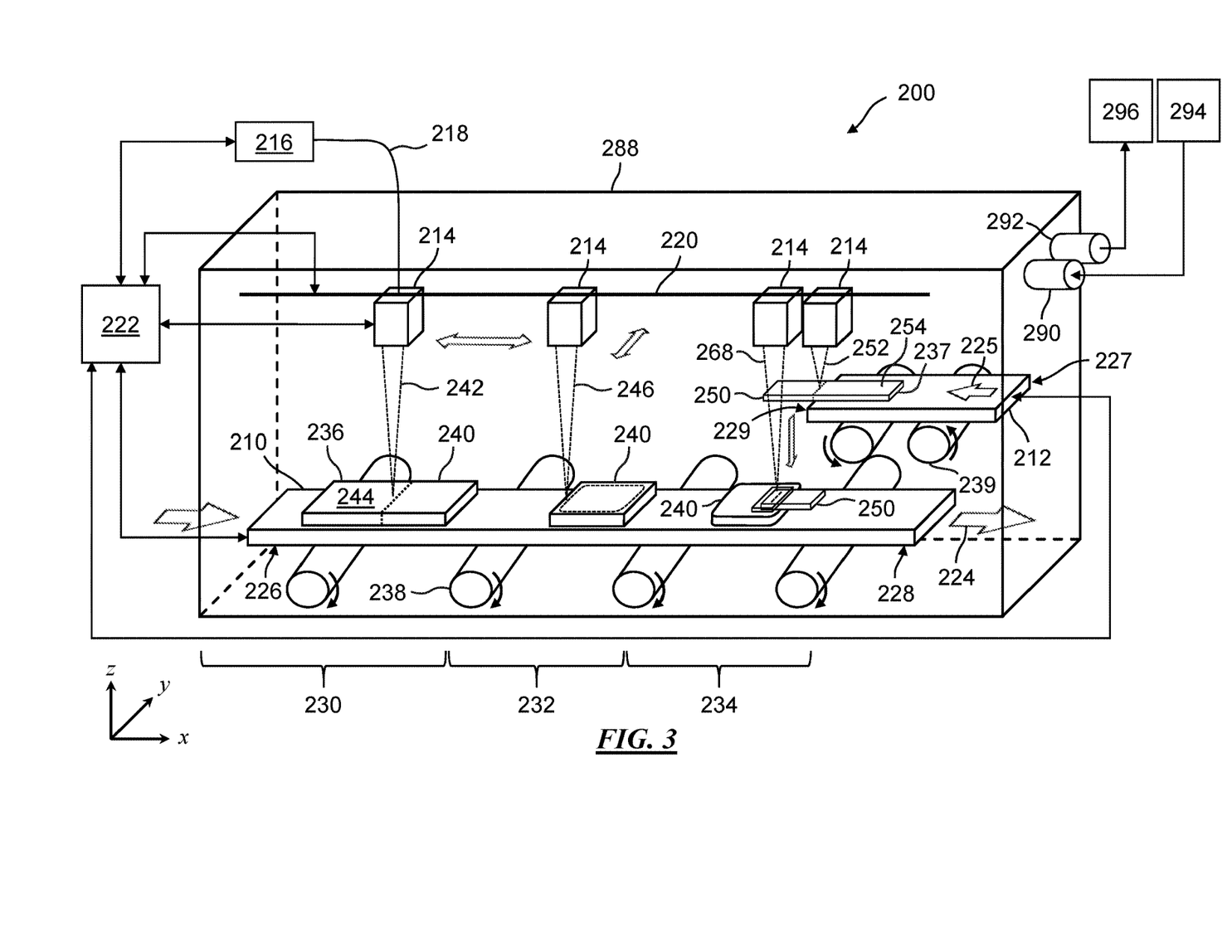
FIG. 3 is a perspective view of a system for manufacturing a negative electrode for an electrochemical cell of a lithium metal battery, the system including a first platform, a second platform, a laser scanning head coupled to a laser beam generator, a gantry, and a control unit.

FIG. 3 illustrates a system 200 for manufacturing the negative electrodes 10, 110. The system 200 includes a first platform 210, a second platform 212, a multipurpose laser scanning head 214 (also referred to as a scan head) coupled to a laser beam generator 216 via a fiber optic cable 218, a gantry 220, and a control unit 222 that controls and coordinates operation of various components of the system 200 so that the multipurpose laser scanning head 214 can be used to perform multiple laser cutting and laser joining operations at different locations during manufacture of the negative electrodes 10, 110.

The first platform 210 extends in a first direction 224, from an upstream end 226 to a downstream end 228, between a cutting station 230, a shaping station 232, and a joining station 234, and is configured to receive a continuous lithium metal sheet 236 and to deliver the lithium metal sheet 236 to the cutting station 230. The second platform 212 extends in a second direction 225 opposite the first direction 224, from an upstream end 227 to a downstream end 229, and is configured to receive a continuous metallic current collector sheet 237 and to deliver one end of the metallic current collector sheet 237 to the joining station 234. Movement of the first platform 210 in the first direction 224 may be accomplished via a first set of rollers 238, and movement of the second platform 212 in the second direction 225 may be accomplished by a second set of rollers 239.

Figure 4:
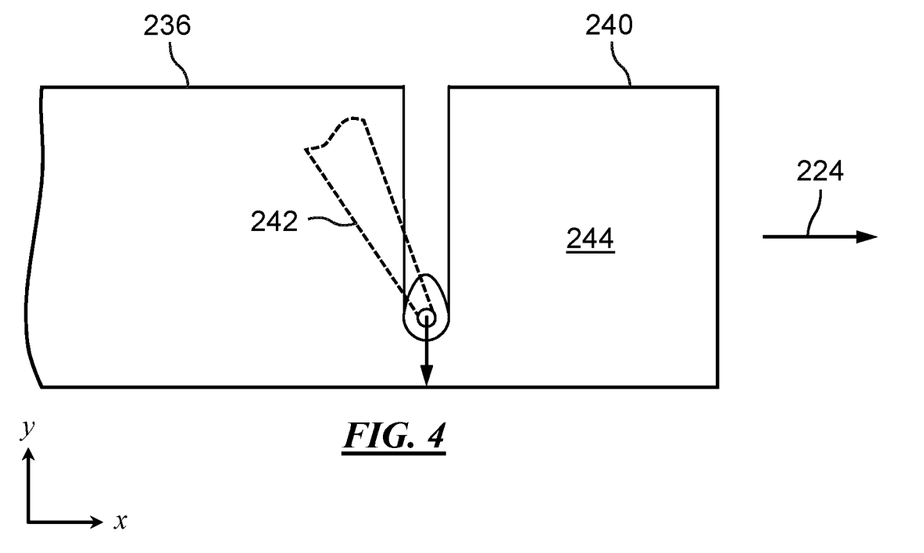
FIG. 4 is a plan view of a lithium metal sheet during a laser cutting operation, wherein an end portion of the lithium metal sheet is severed therefrom to form a lithium metal piece.

After the lithium metal sheet 236 is received at the cutting station 230 at the upstream end 226 of the first platform 210, the control unit 222 may initiate a cutting operation, wherein an end portion of the lithium metal sheet 236 is severed therefrom to form a lithium metal piece 240. More specifically, after the lithium metal sheet 236 is received at the cutting station 230, the control unit 222 may signal the laser beam generator 216 to generate and deliver a diverging laser beam (not shown) to the laser scanning head 214. In the laser scanning head 214, the diverging laser beam may pass through a collimating lens (not shown) and a scanning lens (not shown), such as an f-theta lens, to produce a first focused laser beam 242 having a desired beam spot size at a focal plane of the laser beam 242. The laser scanning head 214 also may include moveable mirrors (not shown), e.g., galvanometer mirrors, and the control unit 222 may control the moveable mirrors in the laser scanning head 214 so that the first laser beam 242 is directed onto a target area on an upper surface 244 of the lithium metal sheet 236. The moveable mirrors in the laser scanning head 214 can be controlled by the control unit 222 to precisely and rapidly move the first laser beam 242 relative to a plane oriented along the upper surface 244 of the lithium metal sheet 236, without moving the laser scanning head 214. As such, after the first laser beam 242 impinges upon the upper surface 244 of the lithium metal sheet 236, the control unit 222 may direct the moveable mirrors in the laser scanning head 214 to advance the first laser beam 242 along a predefined travel path relative to the upper surface 244 of the lithium metal sheet 236. In one form, as best shown in FIG. 4, the predefined travel path tracked by the first laser beam 242 may be linear and may cut across an entire width of the lithium metal sheet 236.

Figure 5:
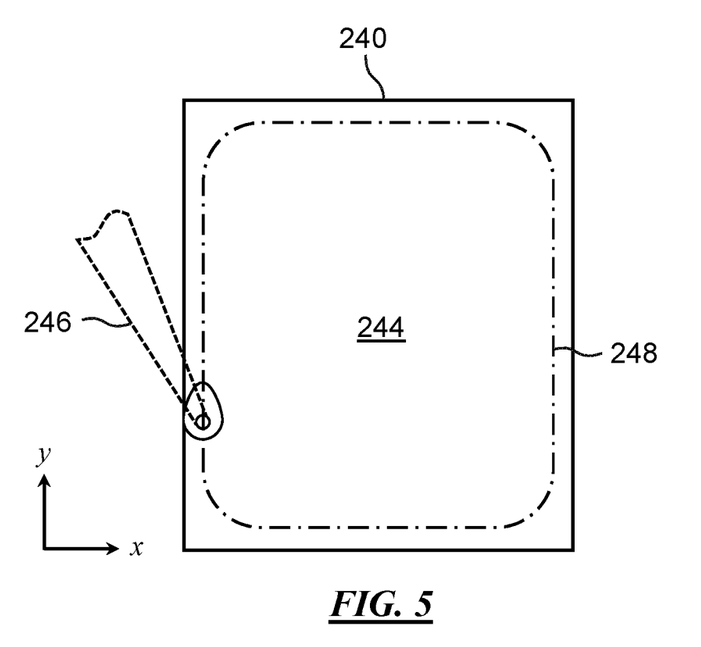
FIG. 5 is a plan view of a lithium metal piece during a shaping operation, wherein the lithium metal piece is trimmed to a desired shape.

After the lithium metal piece 240 is severed from the lithium metal sheet 236, the lithium metal piece 240 may be transferred to the shaping station 232 by the first platform 210 and the laser scanning head 214 may be transferred to the shaping station 232 by the gantry 220. At the shaping station 232, the control unit 222 may initiate a shaping operation, wherein the lithium metal piece 240 is trimmed to a desired shape. More specifically, after the lithium metal piece 240 and the laser scanning head 214 are received at the shaping station 232, the control unit 222 may direct the laser beam generator 216 and the laser scanning head 214 to produce and direct a second focused laser beam 246 onto the upper surface 244 of the lithium metal piece 240 and to advance the second laser beam 246 along another predefined travel path 248 relative to the upper surface 244 of the lithium metal piece 240. In one form, as best shown in FIG. 5, the predefined travel path 248 tracked by the second laser beam 246 may be designed to trim away and round off the corners of the lithium metal piece 240.

After the lithium metal piece 240 has been trimmed to a desired shape, the lithium metal piece 240 may be transferred to the joining station 234 by the first platform 210 and the laser scanning head 214 may be transferred to the joining station 234 by the gantry 220. At the joining station 234, the control unit 222 may initiate a joining operation, wherein a metallic current collector piece 250 is joined to the lithium metal piece 240. In some embodiments, the control unit 222 may direct the laser scanning head 214 to direct a third focused laser beam 252 at an upper surface 254 of the metallic current collector sheet 237 and to advance the third laser beam 252 along a predefined travel path relative to the upper surface 254 to sever an end portion from the metallic current collector sheet 237 and form the metallic current collector piece 250. In such case, the metallic current collector piece 250 cut from the metallic current collector sheet 237 may then drop from the second platform 212 onto the upper surface 244 of the lithium metal piece 240 so that at least a portion of the metallic current collector piece 250 overlaps the lithium metal piece 240.

The first, second, and third laser beams 242, 246, 252 may be pulsed laser beams and may exhibit a power density in the range of $5.0 \times 10^5$ W/cm$^2$ to $1.0 \times 10^9$ W/cm$^2$, a laser beam spot size in the range of 10 micrometers to 200 micrometers, a pulse duration in the range of 0.5-500 nanoseconds, a pulse repetition rate in the range of 1 kHz to 100 kHz, and a velocity in the range of 0.1-2 meters per second.

Figure 6:
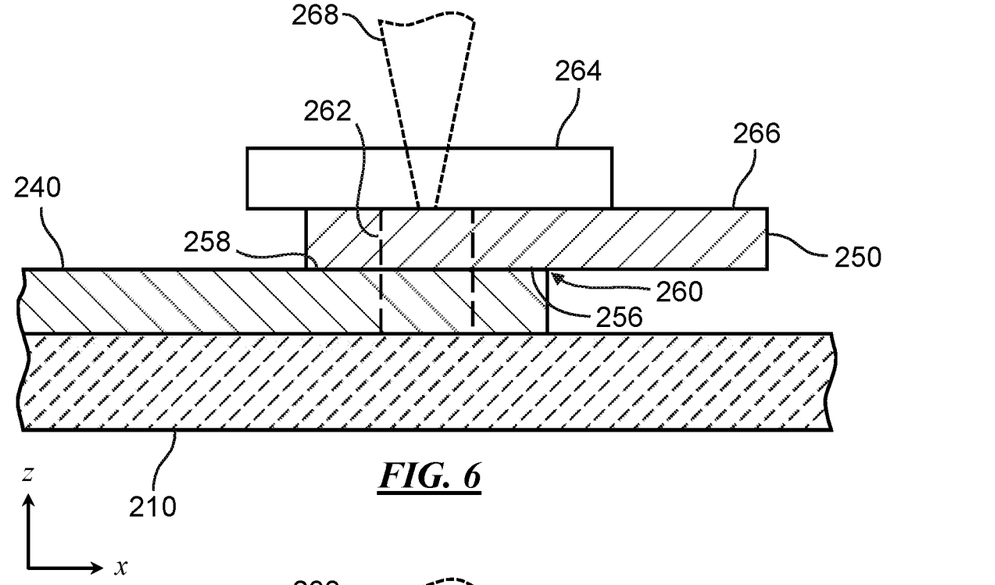
FIG. 6 is a side cross-sectional view of a metallic current collector piece and a lithium metal piece that have been positioned adjacent one another in an at least partially lapped configuration with a transparent cover positioned over an upper surface of the metallic current collector piece.

As best shown in FIG. 6, prior to joining, the metallic current collector piece 250 is positioned adjacent the lithium metal piece 240 in an at least partially lapped configuration such that a faying surface 256 of the metallic current collector piece 250 confronts a faying surface 258 of the lithium metal piece 240 to establish a faying interface 260 between the pieces 240, 250 at an intended weld site 262. Then, a transparent cover 264 is positioned over an upper surface 266 of the metallic current collector piece 250 at the weld site 262. The transparent cover 264 may comprise any material through which a laser beam can be effectively transmitted, for example, the cover 264 may comprise a silica-based glass, e.g., fused silica or quartz. In some embodiments, pressure may be exerted at the weld site 262 on the upper surface 266 of the metallic current collector piece 250 by the transparent cover 264 so that the lithium metal piece 240 and the metallic current collector piece 250 are clamped between the first platform 210 and the transparent cover 264 and the faying surfaces 256, 258 of the pieces 240, 250 press against each other at the weld site 262. The force exerted on the upper surface 266 of the metallic current collector piece 250 by the transparent cover 264 may be in the range of 40 newtons to 400 newtons. The lithium metal piece 240 and the metallic current collector piece 250 are physically bonded to each other by directing a fourth focused laser beam 268 through the transparent cover 264 and onto the upper surface 266 of the metallic current collector piece 250 at the weld site 262. Heat is generated in the current collector piece 250 at the weld site 262 by absorption of energy from the impinging laser beam 268 and is transferred from the current collector piece 250 to the lithium metal piece 240 by conduction, which initiates melting of the lithium metal piece 240 along the faying surface 258 thereof. Unlike the lithium metal piece 240, the current collector piece 250 does not melt along its faying surface 256 during the laser joining operation due to the relatively high melting point of the piece 250, as compared to that of the lithium metal piece 240.

Figure 7:
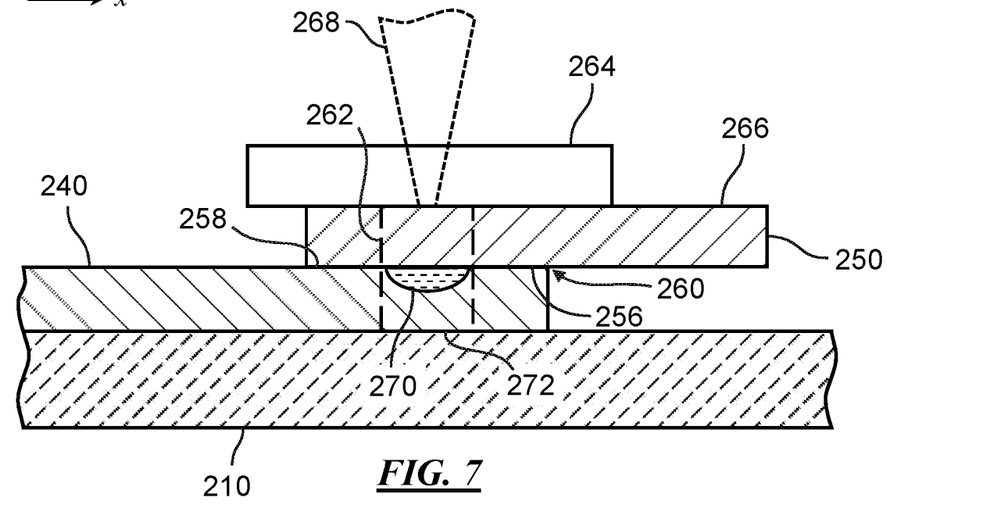
FIG. 7 is a side cross-sectional view of the metallic current collector piece and the lithium metal piece of FIG. 6 illustrating a step in a laser joining operation, wherein a lithium metal molten weld pool is formed at a faying interface established between the pieces at an intended weld site.

Referring now to FIG. 7, the fourth laser beam 268 impinges the upper surface 266 of the metallic current collector piece 250 at the weld site 262 and the heat generated by absorption of energy from the fourth laser beam 268 is conducted through the pieces 250, 240 and creates a lithium metal molten weld pool 270 that partially penetrates the lithium metal piece 240 and extends from the faying surface 258 of the lithium metal piece 240 partway to an opposite surface 272 of the lithium metal piece 240. The power density of the fourth laser beam 268 is controlled so that the laser joining operation is carried out in conduction welding mode so that the molten weld pool 270 does not fully penetrate the lithium metal piece 240, i.e., does not extend through an entire thickness of the lithium metal piece 240. The molten lithium metal from the molten weld pool 270 wets the faying surface 256 of the metallic current collector piece 250, but does not melt or penetrate the faying surface 256 of the current collector piece 250 due to the relatively high melting point of the piece 250, as compared to that of the lithium metal piece 240. The power level, travel velocity, laser beam spot size, and/or focal position of the fourth laser beam 268 (focused at, below, or above the upper surface 266 of the metallic current collector piece 250) may be controlled during the laser joining operation to control the depth and width of the molten weld pool 270.

Figure 8:
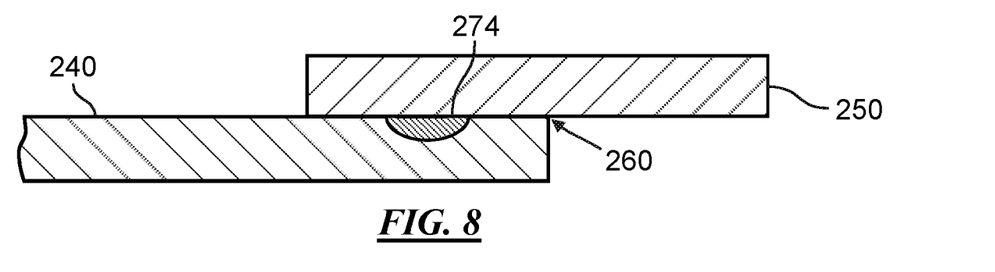
FIG. 8 is a side cross-sectional view of the metallic current collector piece and the lithium metal piece of FIG. 7 after solidification of the lithium metal molten weld pool, wherein the metallic current collector piece and the lithium metal piece are joined together by a solid weld joint.

As shown in FIG. 8, when the fourth laser beam 268 is terminated, the lithium metal molten weld pool 270 rapidly cools and solidifies into a solid weld joint 274 at the faying interface 260 of the current collector piece 250 and the lithium metal piece 240. The resulting weld joint 274 physically bonds the current collector piece 250 and the lithium metal piece 240 together at the weld site 262 and produces a continuous zero-gap interface between the pieces 240, 250 at the weld site 262. The weld joint 274 is formed without addition of a flux, filler, or solder material between the pieces 240, 250 at any point prior to or during the laser joining operation. The weld joint 274 depicted in FIG. 8 is schematic in nature and may or may not be representative of the actual size and shape of the weld joint formed in practice, which may vary depending on the size and shape of the current collector piece 250 and/or the lithium metal piece 240 as well as the travel path followed by the fourth laser beam 268 during the joining operation.

The fourth laser beam 268 may be a pulsed laser beam and may exhibit a power density in the range of $3\times10^5$ W/cm$^2$ to $1\times10^7$ W/cm$^2$, a laser beam spot size in the range of 0.2 millimeters to 1 millimeter, a pulse duration in the range of 0.5-500 nanoseconds, a pulse repetition rate in the range of 100 kHz to 10 MHz, and a velocity in the range of 0.2 meters per second to 2 meters per second.

Figure 10:
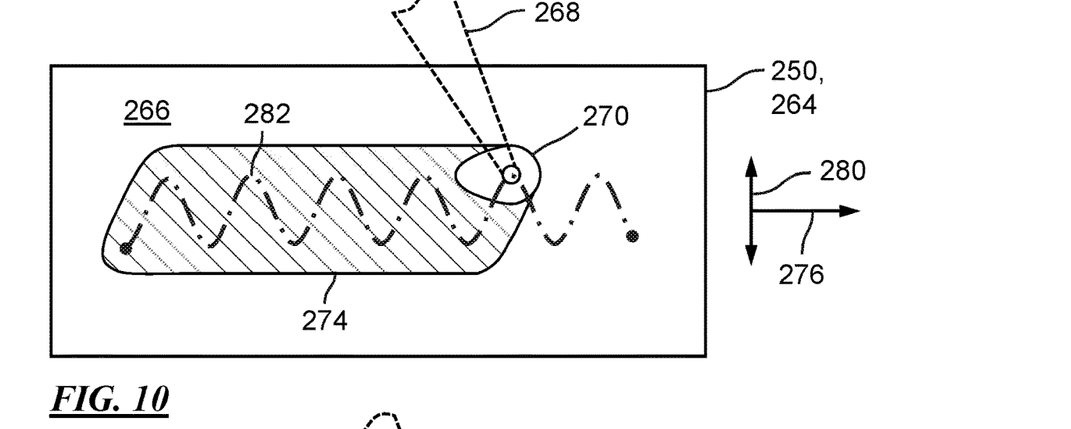
FIG. 10 is a plan view of the metallic current collector piece and the lithium metal piece of FIG. 7 during a laser joining operation wherein a laser beam is advanced relative to an upper surface of the metallic current collector piece from a start point to an end point in a forward direction and back and forth in a lateral direction transverse to the forward direction along an oscillating travel path.
Figure 11:
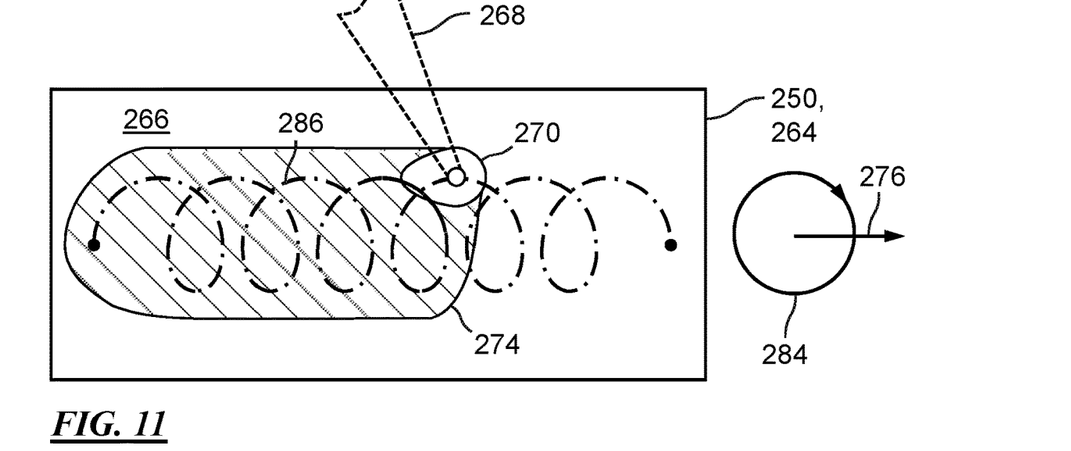
FIG. 11 is a plan view of the metallic current collector piece and the lithium metal piece of FIG. 7 during a laser joining operation wherein a laser beam is advanced relative to an upper surface of the metallic current collector piece from a start point to an end point by moving the laser beam in a forward direction while gyrating the laser beam to form a looped travel path.

For simplicity, only a single weld site 262 is depicted in FIGS. 6 and 7 and only a single weld joint 274 is depicted in FIG. 8; however, in practice, more than one solid weld joint may be formed at multiple different weld sites within an overlapping region of the pieces 240, 250. For example, the current collector piece 250 and the lithium metal piece 240 may be joined together using one or more discrete "spot" welds and/or one or more "seam" welds. A spot weld may be formed by focusing the fourth laser beam 268 at the upper surface 266 of the metallic current collector piece 250 at the intended weld site 262, and then terminating the laser beam 268 without moving the beam 268 or the pieces 240, 250 relative to one another. A seam weld may be formed by directing the fourth laser beam 268 at the upper surface 266 of the metallic current collector piece 250, and then advancing the fourth laser beam 268 along a predefined travel path relative to the upper surface 266 of the current collector piece 250, as shown in FIGS. 9, 10, and 11.

The predefined travel path tracked by the fourth laser beam 268 during the joining operation may be selected based upon the operating parameters of the laser beam generator 216 and the multipurpose laser scanning head 214 and on the resulting attributes of the fourth laser beam 268. For example, in embodiments where the fourth laser beam 268 exhibits a relatively high power density, the travel path tracked by the laser beam 268 may be selected to prevent the laser beam 268 from fully penetrating the metallic current collector piece 250 or the lithium metal piece 240.

Figure 9:
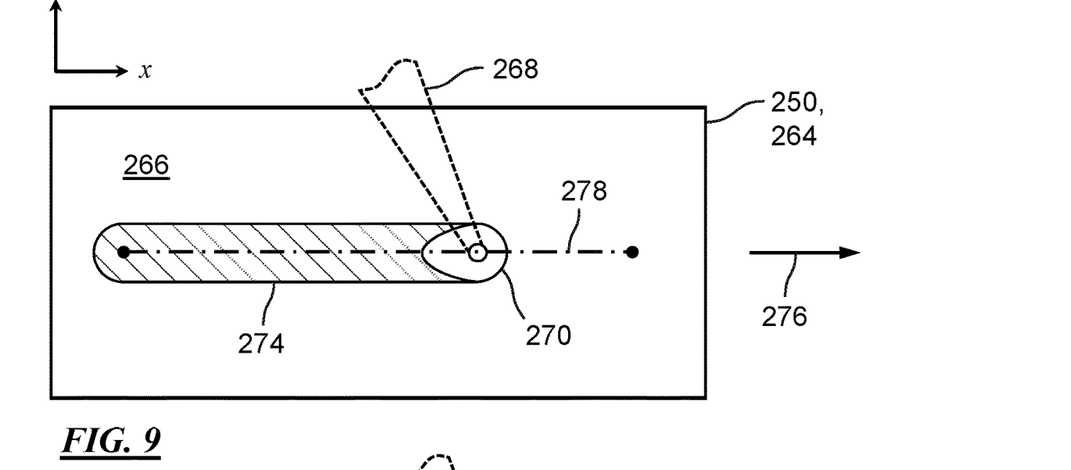
FIG. 9 is a plan view of the metallic current collector piece and the lithium metal piece of FIG. 7 during a laser joining operation wherein a laser beam is advanced relative to an upper surface of the metallic current collector piece from a start point to an end point in a forward direction along a generally linear travel path.

Referring now to FIG. 9, in one form, the fourth laser beam 268 may be advanced relative to the upper surface 266 of the current collector piece 250 from a start point to an end point in a forward direction 276 along a generally linear travel path 278. As the fourth laser beam 268 is advanced along the linear travel path 278, the lithium metal molten weld pool 270 follows and leaves behind molten lithium metal in the wake of the progressing weld pool 270, which quickly cools and solidifies into the solid weld joint 274. Referring now to FIG. 10, in another form, the fourth laser beam 268 may be advanced relative to the upper surface 266 of the current collector piece 250 from a start point to an end point in a forward direction 276 and back and forth in a lateral direction 280 transverse to the forward direction 276 along an oscillating travel path 282. Referring now to FIG. 11, in yet another form, the fourth laser beam 268 may be advanced relative to the upper surface 266 of the current collector piece 250 from a start point to an end point by moving the fourth laser beam 268 in a forward direction 276 while gyrating the fourth laser beam 268 in a circle 284 to form a looped travel path 286.

The cutting station 230, shaping station 232, and joining station 234 may be enclosed within a chamber 288 including an inlet 290 and an outlet 292. During manufacture of the negative electrodes 10, 110, a subatmospheric pressure environment (e.g., less than 1 atmosphere) or an inert gas environment may be created within an interior of the chamber 288 to prevent contamination and/or to prevent undesirable chemical reactions (e.g., oxidation and/or lithium combustion) from occurring between the environment in the chamber 288 and the lithium metal sheet 236, the lithium metal piece 240, the current collector sheet 237, and/or the current collector piece 250. For example, in embodiments where an inert gas environment is generated in the chamber 288, the inlet 290 may be in fluid communication with an inert gas supply 294, and a stream of an inert gas (e.g., argon) may be introduced into the chamber 288 via the inlet 290 during manufacture of the negative electrodes 10, 110. Additionally or alternatively, the outlet 292 of the chamber 288 may be in fluid communication with a vacuum pump and evacuation system 296 to create a subatmospheric pressure environment within an interior of the chamber 288 during manufacture of the negative electrodes 10, 110.

After the lithium metal piece 240 and the metallic current collector piece 250 are physically bonded to each other, the pieces 240, 250 may be transferred to a lithium metal battery manufacturing operation and used as the negative electrode 10, 110 in an electrochemical cell for a secondary lithium metal battery. For example, the bonded pieces 240, 250 may be combined with at least one positive electrode and at least one separator and formed into an electrochemical cell for a lithium metal battery. The negative electrode 10, 110 and the positive electrode may be stacked relative to each other in the electrochemical cell with the separator sandwiched therebetween. In one form, the negative electrode 10, 110, separator, and positive electrode may be stacked one on top of the other and then subjected to a folding operation to form an electrochemical cell stack, which may be sealed within an envelope or pouch to form a pouch-type lithium metal battery.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing a negative electrode for an electrochemical cell of a lithium metal battery, the method including the following steps:
   (a) delivering a continuous lithium metal sheet to a cutting station;
   (b) directing a first laser beam at an upper surface of the lithium metal sheet and advancing the first laser beam relative to the upper surface of the lithium metal sheet to cut off an end portion of the lithium metal sheet and form a lithium metal piece;
   (c) delivering the lithium metal piece to a joining station;
   (d) positioning a metallic current collector piece adjacent the lithium metal piece in an at least partially lapped configuration such that a faying surface of the metallic current collector piece confronts a faying surface of the lithium metal piece to establish a faying interface between the pieces at a weld site;
   (e) positioning a transparent cover over the metallic current collector piece at the weld site such that the transparent cover presses against an upper surface of the metallic current collector piece and the faying surfaces of the metallic current collector piece and the lithium metal piece press against each other at the weld site;
   (f) directing a second laser beam at the upper surface of the metallic current collector piece at the weld site to melt a portion of the lithium metal piece adjacent the faying surface of the metallic current collector piece and produce a lithium metal molten weld pool that wets the faying surface of the metallic current collector piece;
   (g) terminating the second laser beam to solidify the lithium metal molten weld pool into a solid weld joint that physically bonds the lithium metal piece and the metallic current collector piece together at the weld site; and
   (h) continuously repeating and coordinating steps (a) through (g) so that steps (b) and (f) are performed at different times using the same laser scanning head,
   wherein the continuous lithium metal sheet and the lithium metal piece are respectively delivered to the cutting station and to the joining station by a first platform traveling in a first direction, and wherein the metallic current collector piece is delivered to the joining station by a second platform traveling in a second direction opposite the first direction.

2. The method of claim 1 wherein the first laser beam is a pulsed laser beam having a power density in the range of $5.0 \times 10^5$ W/cm$^2$ to $1.0 \times 10^9$ W/cm$^2$ and a pulse repetition rate in the range of 1 kHz to 100 kHz.

3. The method of claim 1 wherein the second laser beam is a pulsed laser beam having a power density in the range of $3 \times 10^5$ W/cm$^2$ to $1 \times 10^7$ W/cm$^2$ and a pulse repetition rate in the range of 100 kHz to 10 MHz.

4. The method of claim 1 wherein the first and second laser beams are generated by the same laser beam generator and movement of the first and second laser beams is accomplished by a plurality of moveable mirrors housed within the same laser scanning head.

5. The method of claim 1 including:
   prior to step (c), transferring the lithium metal piece to a shaping station; and
   directing a third laser beam at an upper surface of the lithium metal piece; and
   advancing the third laser beam relative to the upper surface of the lithium metal piece to trim the lithium metal piece into a desired shape,
   wherein the first, second, and third laser beams are generated by the same laser beam generator and movement of the first, second, and third laser beams is accomplished by a plurality of moveable mirrors housed within the same laser scanning head.

6. The method of claim 1 wherein step (b) includes:
   advancing the first laser beam relative to the upper surface of the lithium metal sheet in a linear path across an entire width of the lithium metal sheet.

7. The method of claim 1 wherein step (f) includes:
   advancing the second laser beam relative to the upper surface of the metallic current collector piece in a non-linear path at the weld site.

8. The method of claim 7 wherein the second laser beam is advanced relative to the upper surface of the metallic current collector piece from a start point toward an end point in a forward direction and back and forth in a lateral direction transverse to the forward direction.

9. The method of claim 7 wherein the second laser beam is advanced relative to the upper surface of the metallic current collector piece from a start point toward an end point in a forward direction while gyrating the second laser beam.

10. The method of claim 1 including:
    enclosing the cutting station and the joining station in a chamber; and
    establishing a subatmospheric pressure environment or an inert gas environment within the chamber to prevent oxidation and combustion of the lithium metal sheet and the lithium metal piece during steps (b) and (f).

11. The method of claim 1 including:
    prior to step (d), directing a fourth laser beam at an upper surface of a metallic current collector sheet; and
    advancing the fourth laser beam relative to the upper surface of the metallic current collector sheet to cut off an end portion of the metallic current collector sheet and form the metallic current collector piece,
    wherein the first, second, and fourth laser beams are generated by the same laser beam generator and movement of the first, second, and fourth laser beams is accomplished by a plurality of moveable mirrors housed within the same laser scanning head.

12. The method of claim 1 wherein the metallic current collector piece comprises a non-porous metallic foil, a perforated metallic sheet, or a porous metallic mesh, and wherein the metallic current collector piece comprises at least one metal or metal alloy selected from the group consisting of copper, nickel, stainless steel, and titanium.

13. The method of claim 1 wherein the solid weld joint is formed between the lithium metal piece and the metallic current collector piece without use of a flux, filler, or solder material.

* * * * *